United States Patent Office 3,736,182
Patented May 29, 1973

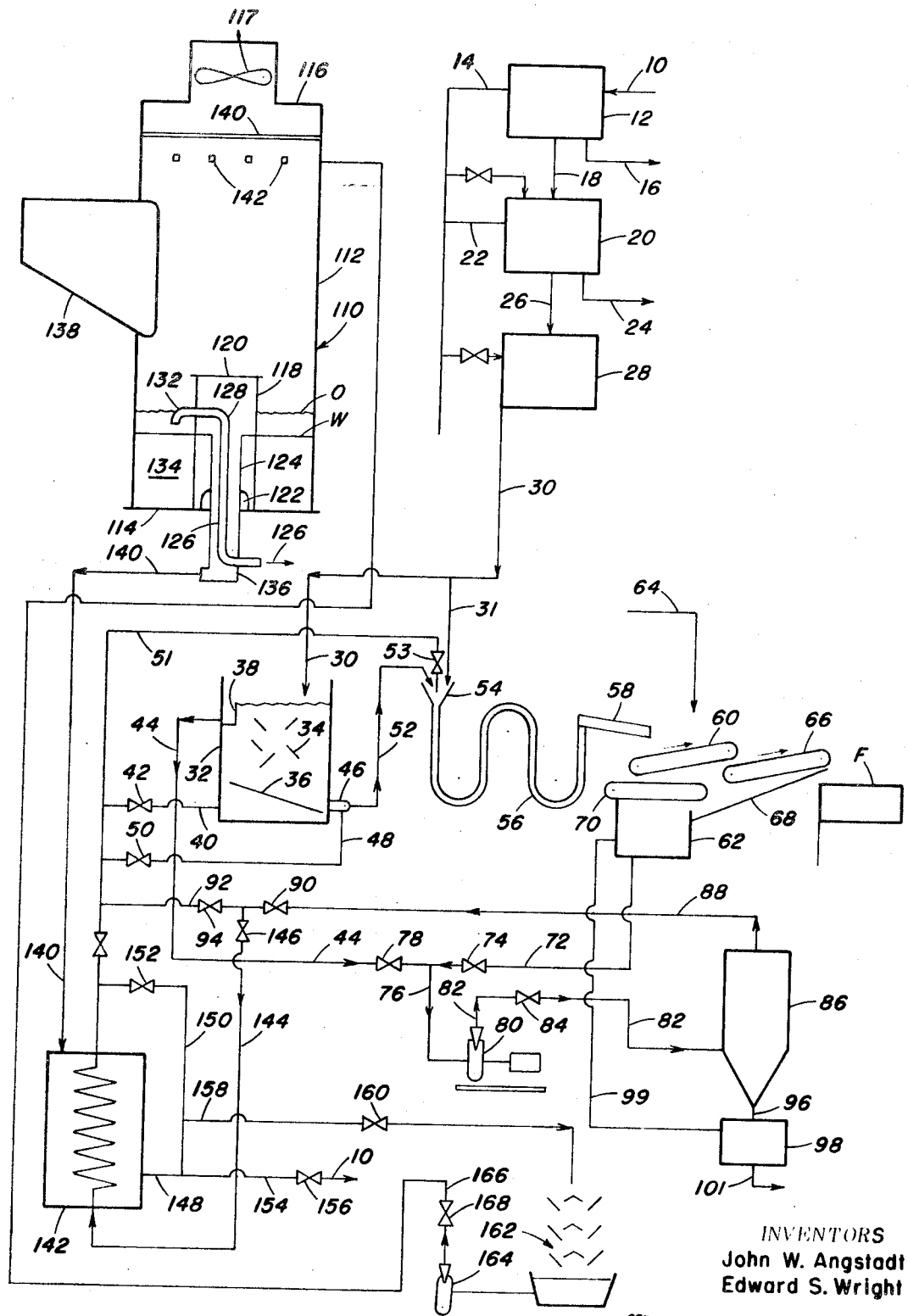

3,736,182
PROCESS AND APPARATUS FOR WASHING
PARTICULATE COMESTIBLE MATERIALS
Edward S. Wright, Pittsburgh, Pa., and John W. Angstadt, Williamsville, N.Y., assignors to Blaw-Knox Food and Chemical Equipment, Inc., Buffalo, N.Y.
Filed June 25, 1971, Ser. No. 156,765
Int. Cl. C13l 1/00
U.S. Cl. 127—24
13 Claims

ABSTRACT OF THE DISCLOSURE

Process and apparatus for substantially reducing wash liquid requirements for the washing of raw particulate comestible materials, particularly potato slices to remove surface starch prior to cooking such slices. Washing of the slices is effected in an elongated zone having an upwardly extending portion wherein the potato slices are passed in concurrent contact with wash water to remove starch exposed during slicing of raw whole potatoes. The potato slices are separated from a starch-enriched wash liquid and are passed to a deep-fat cooking fryer. The starch-enriched liquid is introduced into a concentrator to form a concentrated starch slurry withdrawn for subsequent processing and a lean wash liquid which is returned to the washing step.

BACKGROUND OF THE INVENTION

This invention relates to the washing of comestible materials, and more particularly to the washing of starch from raw potato slices and the subsequent treatment of the wash liquid to minimize wash liquid requirements.

Presently, potatoes being prepared for processing to produce potato chips are sliced, washed and passed to the deep-fat fryer. The wash liquid, usually water, contains a significant quantity of starch which is generally disposed of by passing the wash liquid to sewage after treatment in a system employing large vats with mechanical agitators and flow action devices which require daily dismantling of various parts for manual shoveling of residual starch. It is well known that starch is deleterious to most sewage systems since a solution thereof has a high BOD (biological oxygen demand) level which would require a higher concentration of oxygen together with greater concentration of aerobic microorganisms to effectively digest materials passed to a sewage system together with a starch enricher water liquid stream. In many locales, a manufacturer of potato chips, partially cooked french fries, etc. must pay the local government a special fee to pass a starch-enriched effluent from a potato washing operation.

OBJECTS OF THE INVENTION

It is an object of the invention to provide a novel process and apparatus for washing raw comestible materials.

Another object of the invention is to provide a novel process and apparatus for washing raw comestible materials, such as potato slices and the like, having exposed starch-containing surface areas.

Still another object of the invention is to provide a novel process and apparatus for washing raw comestible materials, such as potato slices and the like, wherein fresh water requirements are substantially reduced.

Yet another object of this invention is to provide a novel process and apparatus for washing raw comestibles materials, such as potato slices and the like, using the hydraulic flow action of water which apparatus can be manufactured and maintained for considerably lower costs than presently employed systems.

A further object of the invention is to provide a novel process and apparatus for washing raw comestible materials, such as potato slices and the like, wherein the quantity of starch in the slurry to be treated is substantially reduced.

A still further object of the invention is to provide a novel process and apparatus for washing raw comestible materials, such as potato slices and the like, wherein a powdered starch product may be recovered from a starch slurry.

These and other objects of my invention are accomplished by passing a raw particulate comestible, such as potato slices, string beans, peas, lima beans, olives and the like, through an enlongated washing zone in concurrent flow to a wash liquid. The wash liquid including suspended solids, such as surface starch exposed during the slicing of potatoes, is passed to a hydroclone or hydroclones wherein a concentrated slurry of the solids is withdrawn for subsequent handling, i.e., disposal, concentration etc. A wash liquid stream is withdrawn from the hydroclone and recycled to an upstream processing step whereas the concentrated slurry is passed to a plurality of settling tanks from which another wash liquid stream is withdrawn and recycled thereby substantially reducing fresh wash liquid requirements. Anti foaming agents may be added to the wash liquid to control starch foaming and minimize starch carry over into the discharge sewer system.

Another aspect of the invention is to recover oils entrained in the water vapor resulting from a deep-fat cooking process with fresh wash liquid and subsequently utilizing the liquid for the preliminary treatment of the comestible material, e.g., washing of whole potatoes and/or in the peeling of whole potato.

BRIEF DESCRIPTION OF DRAWING

Further objects and advantages of the invention will become apparent upon consideration of the detailed disclosure thereof, especially when taken with the accompanying drawing illustrating a schematic flow diagram of the invention for the washing of particulate comestible material wherein like numerals designate like parts throughout.

DETAILED DESCRIPTION OF THE INVENTION

This invention relates to copending application Ser. No. 108,303, filed Jan. 21, 1971, directed to the continuous deep-fat cooking of a raw comestible, particularly potato slices, to produce a processed comestible, i.e., potato chips. In a preferred embodiment of the invention, raw potato slices are introduced into one end of an elongated cooking zone and contacted with cooking oil introduced into the cooking zone over a large area. The cooking zone is partially enclosed with a hood including a vent to collect the water vapor and vaporized and/or entrained cooking oil. To facilitate and understanding of the present invention, the embodiments hereof will be described with respect to the treatment of raw potatoes to prepare potato slices suitable for the deep-fat cooking thereof to form potato chips as described in such copending application, it being understood, however, that other comestibles may be treated in accordance with this invention. It will be understood that additional valving and piping configurations are provided consistent with accepted pracices in the art.

Referring now to the drawing, raw whole potatoes in line 10 are introduced into a washer 12 and contacted with wash liquid in line 14 under conditions to remove soil and like extraneous materials adhering to the whole potatoes which are removed in slurry form with water in line 16. The whole potatoes are conveyed by line 18 to peeler 20 wherein the skin or dermis of the potato is removed, generally by causing the potatoes to abrade against each other and against abrasive coatings on the bottom and periphery of the peeler in the presence of wash water introduced into peeler 20 by line 22. The skin particles in slurry form are removed, as indicated, by line 24, and the thus peeled potatoes are conveyed by line 26 to a slicer 28 wherein potato slices of uniform thickness are prepared. The washer 12, peeler 20 and slicer 28, per se, do not constitute part of the invention, and are known and used by those skilled in the art.

The potato slices are conveyed from slicer 28 by line 30 to blanching tank 32 including suitable baffles 34, a perforated plate 36 and a weir 38, wherein the slices are passed in countercurrent contact with a wash liquid flowing upwardly through perforated plate 36 introduced into blanching tank 32 by line 40 under the control of valve 42. A portion of the starch exposed by the slicing operation (cell destruction) is washed from the surface of the potato slices and is withdrawn as a starch slurry from tank 32 by line 44 upon overflowing weir 38 of the tank 32. The slices fall by gravity in the tank 32 toward the perforated plate 36 and are caused to move to the outlet conduit 46 thereof wherein wash water added by line 48 under the control of valve 50 causes the potato slices to pass through line 52 to collector device 54. Water in line 51 under the control of valve 53 is introduced into collector device 54 and together with the potato slice-slurry in line 52 are passed through washer 56, generally illustrated as a serpentine elongated tube, wherein the potato slices pass in concurrent flow to the wash liquid to further remove surface starch from the slices. While the configuration of the washer 56 is illustrated as being a serpentine tube, it will be understood that any configuration will suffice, e.g., one U-bend, etc. provided that the wash liquid may be passed in concurrent contact to the raw comestible materials. While the outlet conduit 46 of the blanching tank 32 is indicated as being below the inlet to the collector device 54, it is understood that the tank 32 may be positioned above collector device 54 to permit gravity feed of the slices into the collector device 54.

The slurry of slices in washer 56 is passed onto chute 58 from which the slurry is directed onto a first perforated conveyor 60 to separate the slices from a major portion of the liquid including suspended solids. A portion of the suspended solids is collected on a fine mesh conveyor 70 whereas the remaining portion of the suspended solids and wash liquid is collected in tank 62. At this point, fresh wash water may be introduced into the system by directing such wash water from line 64 onto the perforated conveyor 60 or directly into tank 62 provided with a liquid level control (not shown). The slices on conveyor 60 are passed to a second perforated conveyor 66 for further drainage from which the slices are introduced into a deep-fat fryer, generally indicated as F, such as disclosed in the aforementioned copending application for producing potato chips. The wash liquid passing through perforated conveyor 66 is collected on a pan 68 from which it is also passed into tank 62 through fine mesh conveyor 70. The conveyor 70 has a smaller mesh size than conveyor 60 to remove fragments from the wash liquid passing to the tank 62.

The starch slurry withdrawn from tank 62 by line 72 under the control of valve 74 is combined in line 76 with a starch slurry in line 44 under the control of valve 78 and is passed by pump 80 through line 82 under the control of valve 84 to a hydroclone 86, it being understood that a plurality of hydroclones may be provided. In the hydroclone 86, such as those known and used by those skilled in the art, a concentrated starch slurry and a secondary wash liquid stream having a relatively low concentration of starch are formed by the centrifugal action of tangentially introducing the starch slurry in line 82. Such a hydroclone is known and used by those skilled in the art. The secondary wash liquid withdrawn from hydroclone 86 in line 88 constitutes a portion of the wash liquid for the process and in a preferred embodiment constitutes a major portion thereof. The secondary wash liquid in line 88 under the control of valve 90 may be passed by line 92 under the control of valve 94 to collector 54 by line 51 under the control of valve 53. The concentrated starch slurry formed in hydroclone 86 is withdrawn from the bottom of the hydroclone through line 96 and is passed to the first of a plurality of settling tanks, generally indicated as 98, wherein the starch is settled out using a cascade system. The liquid (low in starch) in line 99 overflowing the last settling tank is returned to the process, e.g., to tank 62, where starch can be periodically removed through line 101, or allowed to settle and be disposed of by dumping depending on the size of the operation.

For certain applications, the blanching operation may be omitted, in which case the potato slices prepared in slicer 28 are conveyed by line 31 directly to collector 54 for passage through washer 56. While this aspect of the invention has been described with reference to potato slices as a particulate material, it is understood that other particulate comestibles may be treated as well as whole comestibles, such as peas, string beans, and the like. Water losses in the system are limited to the washing and peeling operations and surface water on the material passed for subsequent treatment. The process of this invention may reduce water requirements by as much as 96% while simultaneously reducing the amount of starch which is passed to sewage systems as compared to conventional techniques.

Another aspect of the present invention relates to the recovery of cooking oil and condensation of water vapors from the deep-fat cooking of the potato slices in fryer F which is accomplished in a condenser, generally indicated as 110. The condenser 110, as illustrated in drawing, is comprised of a cylindrically shaped body 112 having a base 114 and a top, generally indicated as 116, including an axial fan 117. Centrally disposed within the body 112 and affixed (such as by welding) to the base 114, there is provided a cylindrical tube 118 enclosed at the top thereof by a plate 120 and provided with a port 122 adjacent the base 114. A second cylindrical tube 124, in coaxial alignment with the tube 118, is affixed to the base 114 and extends through the base 114 and upwardly a predetermined distance, as more fully hereinafter discussed.

A conduit 126 is disposed within the tube 118 is coaxial alignment thereto and has a 90° elbow 128 threaded thereon at the upper portion. A horizontally disposed conduit 130 is threaded on the other end of the elbow 128 and is provided with an end section 132 extending through the tube 118 (in fluid tight relationship) into a collecting zone 134 formed by the inside of the body 112 with the outer portion of the tube 118. The lower portion of the tube 124 is provided with an end section 136 including a conduit and through which section the conduit 126 extends in fluid tight relationship.

Intermediate the top 116 and base 114 of the condenser 110, there is provided an inlet 138 to receive the vaporous mixture from the fryer F. Disposed below the top 116 of the condenser 110 and extending over the area of the body 112, there is provided a mesh screen 140 to assist in collecting entrained liquid. Below the mesh screen 140, a plurality of spray nozzles, generally indicated as 142, are positioned to introduce a cooling liquid, such as water, etc., in countercurrent contact with the incoming vaporous mixture. It will be understood that the sizing of the condenser 110 will be determined, generally, by the maximum rated capacity of the fryer F.

In operation, a vaporous mixture including water vapor, cooking oil vapor and entrained cooking oil is introduced into the condenser 110 through inlet 138 wherein the gaseous mixture is contacted with a cooling water introduced through spray nozzles 142. A portion of the water vapor is condensed together with substantially all of the cooking oil vapor which together with entrained cooking oil and unvaporized cooking liquid is collected in zone 134. It will be appreciated that some cooking oil will be discharged to the atmosphere, as will be understood by those skilled in the art of vapor-liquid contact. The cooking oil and water being substantially immiscible with the specific gravity of water in the liquid phase being normally greater than the specific gravity of the cooking oil will result in the separation thereof into two liquid phases with the water phase being below that of the oil phase. In the drawing, the interface between the water phase and the oil phase is designated W whereas the oil phase level is designated O. Oil is withdrawn from the oil phase through extension 132 and passed by conduit 126 to a surge tank (not shown) from which the oil may be returned to the fryer F for reuse or may be stored for subsequent sale. Water in collecting zone 134 is caused to flow through the ported section 122 upwardly between tubes 118 and 124 thereby overflowing the upper portion of tube 124 (by the weight of the combined column of liquids) and is withdrawn from the condenser 110 by line 140. It will be understood that during start-up that the operation of the condenser 110, particularly the flow rate of the cooling liquid, will be controlled to minimize carryover of either liquid into the other liquid stream.

In a preferred embodiment of the invention, the conduit configuration of the wash water system for treatment of the potato slices is integrated with the conduit configuration of the water system of the condenser 110. Accordingly, as illustrated, the water stream in line 140 is passed through heat exchanger 142 in indirect heat transfer relationship with the secondary wash water introduced thereto in line 144 under the control of valve 146 from hydroclone 86 by line 88. The water stream withdrawn from heat exchanger 142 in line 148 may be divided into a plurality of streams depending on processing requirements. A portion of the water stream in line 148 may be passed by line 150 under the control of valve 152 to collector 54. Another portion of the water stream in line 148 may be passed by line 154 under the control of valve 156 to line 10 to the washing and peeling operation. Still another portion of the water stream in line 148 may be withdrawn in line 158 under the control of valve 160 and passed to a cooling tower, schematically illustrated as 162, from which it is subsequently passed by pump 164 through line 166 under the control of valve 168 to condenser 110 to provide all or a portion of the heat transfer requirements of condenser 110. It will be appreciated that the integrated system may be operated in a varied manner depending on process and heat requirements. For instance, all of the cooling water requirements for the condenser 110 may be satisfied by passing a specified portion of the water stream in line 148 through cooling tower 162, i.e., essentially a closed system, except for the stream condensed in condenser 110. Fresh water for the process is shown as being introduced in line 64 onto perforated conveyor 60, however, fresh water may be introduced as the condensing medium for condenser 110 with water for the washing and peeling operation (lines 10 and 22) being provided by water in line 148.

For certain operations, the blanching operation may be omitted, in which case, the potato slices are conveyed directly from the slicer 28 to the collector 54 through line 31. Additionally, the lean water stream from hydroclone 86 will pass directly through lines 88 and 51 to conveyor 54 by-passing heat exchanger 142.

The following examples are illustrative of conditions for the process of the invention and it is to be understood that the scope of the invention is not to be limited thereby.

EXAMPLE I

Dirty potatoes at the rate of 12,000 pounds per hour are passed through washer 12 and peeler 20, and sliced in slicer 28 from which the slices are conveyed to collector 54 and contacted with wash water at the rate of 220 g.p.m. The combined stream (10–20% solids of potato slices) is passed through the washer 56 and separated by conveyors 60 and 66 from which the slices are discharged into fryer F whereas the water stream containing about 85 to 92% of the surface starch (exposed during slicing of the potatoes) is collected in tank 62 and passed to hydroclone 86 for subsequent treatment. Substantially all of the wash water is recovered from the hydroclone for recycling after treatment in the cascade system 98.

EXAMPLE II

Dirty potatoes at the rate of 12,000 pounds per hour are passed through washer 12 and peeler 20, sliced in slicer 28 from which the slices are conveyed to blanching tank 32. The potato slices are countercurrently contacted with a water stream in tank 32 introduced into tank 32 at the rate of 200 g.p.m. About 160 g.p.m. of the water introduced over line 40 flows the weir 38 whereas 40 g.p.m. passes through line 52. The slices are withdraw 40 g.p.m. from the bottom of the tank 32 by a water stream in line 48 introduced at the rate of 125 g.p.m. The slurry of slices is passed to collector 54 whereat 100 g.p.m. of water in line 51 is also introduced with the slurry of slices being thereafter passed through washer 56. The potato slices are separated on the conveyor from the wash water including suspended solids in line 72 which is passed to the hydroclones. Substantially all of the water is recycled after treatment of the wash water in line 72.

Essentially, in both examples, the only water lost is approximately 5 to 10% of the weight of slices washed, which is in a 12,000 lb. per hour system approximately 1.5–3 g.p.m.; and the water lost in washing out the system at the end of the day's or the week's operation, whichever is used as the cleanout cycle. With the process of the present invention about 500 gallons of destarched water and washup cycle water would be discarded, which, in a 40-hour system, would be equivalent to about .02 g.p.m., as compared with washing systems currently being used wherein fresh water requirements are in the order of magnitude of from 60 to 70 g.p.m. Additionally, the waste water (60 to 70 g.p.m.) from such systems is passed to the sewer and contains a high concentration of starch (high BOD). The process of the present invention not only makes it possible to eliminate or substantially reduce the amount of starch (high BOD) being introduced into the sewer, but also reduces the sewer load in the production rate described above in the order of magnitude amount of about 8 million gallons per year based on 2000 hours of operation. Furthermore, the high flow rate of the present invention, along with the starch removal, maintains the system clean, whereas at the end of a day in many existing plants, hours of labor are required to remove starch settled out in the bottom of the washer vat.

While some of the presently used processes have automatic starch removal means, e.g., suspending the starch collected in a washing vat, such starch slurries (at high concentrations) at the rate of 60 to 70 g.p.m. are nevertheless passed for disposal to the sewer.

Numerous modifications and variations of the invention are possible in light of the above teachings and therefore the invention may be practiced otherwise than as particularly described.

We claim:

1. A process for contacting a raw particulate comestible to remove a substance exposed during particulation which comprises:
    (a) passing said particulate comestible through an elongated tubular zone including an upwardly extending subsection in concurrent contact with a water stream;
    (b) separating said particulate material from a substance-enriched water stream; and
    (c) passing said substance-enriched water stream to a concentrating zone to form a concentrated substance-enriched water stream and a lean water stream.

2. The process as defined in claim 1 wherein the lean water stream of step (c) is passed to step (a).

3. The process as defined in claim 1 wherein fresh water contacts the particulate material separated in step (b).

4. The process as defined in claim 1 wherein said raw particulate comestible are potato slices and said substance is starch.

5. The process as defined in claim 4 wherein the potato slices pass downwardly in countercurrent contact with a water stream in a large area zone prior to passage to said tubular zone and wherein the water stream withdrawn from said large area zone is combined with the starch-enriched water stream.

6. An apparatus for contacting a raw particulate comestible to remove a substance exposed during particulation which comprises:
   an elongated conduit having an upwardly extending portion;
   means for introducing said particulate material into said conduit;
   means for introducing a wash liquid into said conduit in concurrent flow to said particulate material and at a greater velocity than said particulate material whereby said substance becomes suspended in said wash liquid; and
   drainage means to separate said particulate material from a substance-enriched wash liquid.

7. The apparatus as defined in claim 6 wherein said particulate material is first introduced into an enlarged wash means wherein the particulate material is passed in counter-current contact with a wash liquid to remove partially a portion of said surface substance.

8. The apparatus as defined in claim 7 wherein a partially substance-enriched wash liquid is withdrawn as overflow from said enlarged wash means.

9. The apparatus as defined in claim 7 wherein said drainage means includes a perforated conveyor assembly.

10. The apparatus as defined in claim 9 wherein said drainage means includes a fresh wash liquid conduit.

11. The apparatus as defined in claim 10 wherein said substance-enriched liquid is passed to a hydroclone means for separation into a recycle wash liquid and a substance-enriched slurry.

12. The apparatus as defined in claim 11 wherein said recycle wash liquid is passed to said elongated conduit.

13. The apparatus as defined in claim 12 wherein said recycle wash liquid is passed through a heat exchange means prior to passage to said elongated conduit.

References Cited

UNITED STATES PATENTS

| | | | |
|---|---|---|---|
| 1,006,312 | 10/1911 | Steffen | 127—25 X |
| 2,163,977 | 6/1939 | Ferry | 127—25 X |
| 2,812,254 | 11/1957 | Smith | 99—100 P |
| 2,974,068 | 3/1961 | Fontein | 127—24 X |
| 3,079,283 | 2/1963 | Dreissen | 127—24 X |

MORRIS O. WOLK, Primary Examiner

S. MARANTZ, Assistant Examiner

U.S. Cl. X.R.

55—89; 99—100 P; 127—25, 67, 69; 241—15, 38